United States Patent

Sutherland

[15] 3,684,876

[45] Aug. 15, 1972

[54] VECTOR COMPUTING SYSTEM AS FOR USE IN A MATRIX COMPUTER

[72] Inventor: Ivan E. Sutherland, Salt Lake City, Utah

[73] Assignee: Evans & Sutherland Computer Corporation

[22] Filed: March 26, 1970

[21] Appl. No.: 24,053

[52] U.S. Cl. ..................235/152, 235/156, 235/164, 235/168

[51] Int. Cl. ............................G06f 7/385, G06f 7/38

[58] Field of Search......235/152, 156, 164, 165, 168, 235/173, 175

[56] References Cited

UNITED STATES PATENTS

| | | | |
|---|---|---|---|
| 3,541,516 | 11/1970 | Senzig | 235/156 X |
| 3,331,954 | 7/1967 | Kinzie et al. | 235/175 X |
| 3,551,663 | 12/1970 | Herron et al. | 235/156 X |

*Primary Examiner*—Charles E. Atkinson
*Assistant Examiner*—James F. Gottman
*Attorney*—Nilsson, Robbins, Wills & Berliner

[57] ABSTRACT

A computing structure is disclosed for vector computation which structure is adaptable to accomplish mathematical solutions by iterative computation. Specifically, the structure includes first and second register means each of which is capable of registering a vector comprising a plurality of distinct components. Arithmetic means, e.g. a plurality of adders, is connected to each of the register means, for performing an arithmetic combination, e.g. determining the average value of similar components from the two register means. After each cycle, the arithmetic means transfers the results of its operative selectively to one or the other of the register means in accordance with the operation of a control unit. Control may be based upon a sequence of binary bits from an external source, or the signs or other signals developed in the course of computation or a combination thereof.

4 Claims, 4 Drawing Figures

INVENTOR.
IVAN E. SUTHERLAND
BY
Nilsson, Robbins, Wills & Berliner
Attorneys

INVENTOR
IVAN E. SUTHERLAND
BY
Nilsson, Robbins, Wills & Berliner
Attorneys.

VECTOR COMPUTING SYSTEM AS FOR USE IN A MATRIX COMPUTER

BACKGROUND AND SUMMARY OF THE INVENTION

The speed and accuracy of modern electronic computers has enabled economic computation in areas not previously practical or possible. For example, the field of computer graphics utilizes computing systems to develop visual images that physically may be non-existent and which may change in real time in accordance with varying input signals. Such systems simply were not possible prior to the development of high-speed computing techniques, because the initial computation was vast and subsequent calculations could not proceed at a speed approaching real time.

Other areas of computation were impractical in the past because of the tremendous calculation effort which would have been required to accomplish solutions. For example, the solution of matrix problems as presented in linear programming has now become economically feasible in view of recently developed computing techniques.

In the development of modern computing techniques and systems, many different structural forms have been proposed and employed. Initially such structures were generally directed to apparatus for performing relatively simple arithmetic operations. However, somewhat recently conceptually integrated systems have been developed for more effectively solving sophisticated and complex mathematical problems. Specifically, for example, such a system was disclosed in a paper entitled "A CLIPPING DIVIDER" which was presented late in 1968 at the AFITS Fall Joint Computer Conference. That system is disclosed in detail in pending U.S. Patent application, Ser. No. 878,018 filed Nov. 19, 1969, now U.S. Pat. No. 3,639,736, and entitled CLIPPING DIVIDER SYSTEM.

In general, the Clipping Divider System as disclosed in the above-referenced patent application operates iteratively to compute signals representative of an interim point in a line as defined by vectors. As explained in the above referenced technical paper and in greater detail in the referenced patent application, such an operation is exceedingly useful in the field of computer graphics, as for example to rapidly determine the terminal ends of a line which are to be used when less than the full length of the line is to be exhibited as in the limited display of a large drawing.

The present invention relates to an expansion of certain basic concepts that are involved in the above-identified Clipping Divider System. That is, it has been discovered that certain of the basic concepts of the Clipping Divider System may be expanded and incorporated with additional structure to accomplish an effective vector computing apparatus which may be utilized to perform several forms of complex computation, e.g. combined multiplication and division operations, matrix operations, and to thus afford the basis of an improved matrix computer.

The system hereof operates on vector quantities, e.g. plural-component quantities. For example, a vector may consist of rectangular coordinates designating a point, as on a line, in a simple two-dimensional example or a vector may consist of many components (as in a multi-dimensional linear programming situation). Such vectors may be formulated into matrices in the solution of various problems. That is, in general, a matrix consists of a rectangular array of numbers comprising a plurality of vectors which array is subject to various mathematical operations as addition, multiplication, inversion and so on, according to specified rules to accomplish a particular solution. The system hereof as disclosed in detail may be effectively embodied in a matrix computer to perform such operations.

BRIEF DESCRIPTION OF THE DRAWINGS

In the drawings which constitute a part of this specification, exemplary embodiments demonstrating various objectives and features hereof are set forth as follows.

DETAILED DESCRIPTION OF ILLUSTRATIVE EMBODIMENTS

Figure 1:
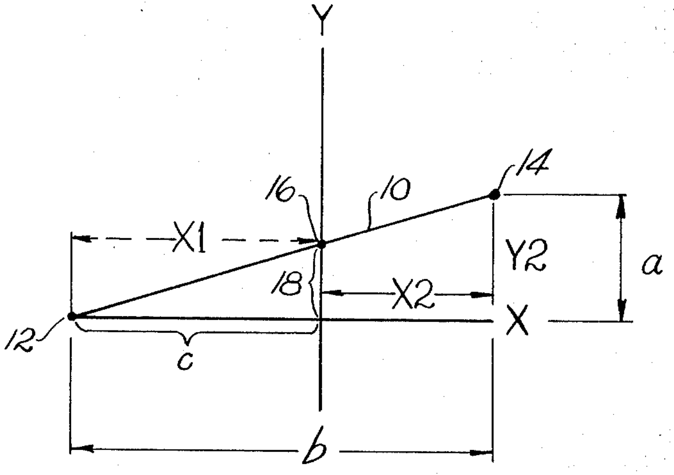
FIG. 1 is a graph illustrative of an operation to be performed by a system of the present invention.

Referring initially to FIG. 1, there is shown a line 10 represented on a rectangular graph with "X" and "Y" coordinates. One end 12 of the line 10 is displaced negatively along the X axis while the other end 14 of the line is displaced positively with both an X and a Y component. The locations of the ends 12 and 14 of the line 10 may be placed or identified by rectangular components, i.e. 0, $-X1$ and $+Y2$, $+X2$, respectively. Functionally, the system hereof can be operated to locate the intersection of the line 10 with the Y axis. That is, the system is capable, for example, of locating the point 16 by specifying the distance as indicated by the numeral 18. Considering that operation in somewhat greater detail, if the end 12 is specified by a vector in rectangular-coordinate form and the end 14 is specified by a similar vector, the average value of the two vectors will define a point midway along the length of the line 10. By an iterative process of dividing a defined line and discarding one portion, the point 16 may be located so that the graphically indicated distance 18 can be attained as the objective of such computation.

This exemplary computation has various practical uses depending upon the implementation of the system. For example, in this regard, the system may be effectively utilized as a divider. If the end 12 (FIG. 1) is located at $X1=-1$ and the end 14 is located at $X2=b-1$, the quantity graphically represented by the distance 18 equals $a/b$, where $a$ is Y2. Thus, a divider is provided for signal-represented quantities $a$ and $b$.

The system hereof may also be utilized to accomplish complex or compound arithmetic operations, for example calculations in the form of combined divisions and multiplications. Specifically, for example, referring again to FIG. 1, the ratio is apparent which establishes: $c/\mathbf{18}=b/a$. That is, the distance represented by the letter $c$ is to the distance 18, as the distance $b$ is to the distance $a$. Solving the ratio for the distance 18 yields: distance $\mathbf{18}=ca/b$. Thus, the system hereof can be effectively employed to perform a compound arithmetic operation including one multiplication and one division of quantities as signal-represented forms of the quantities *c*, *a* and *b*. Accordingly, considerable time economy can result. That is the system enables a combination computation at a considerable saving of time in relation to conventional systems. These operations are merely illustrative of exemplary uses of the system in relation to the location of the intersection of a vector line with a coordinate axis or plane. Other exemplary computations of which the system hereof is capable, include, for example, the capability of multiplying a vector by a scaler, e.g. $\alpha P=(1-\alpha) Q$; where $\alpha$ is a binary fraction and $P$ and $Q$ are vector quantities.

The system hereof may also be utilized to accomplish various matrix operations including matrix inversion. In a related function, the system may be employed to test columns of a matrix for the presence of a particular sign, as in applications involving linear programming in which there are many surfaces present.

The various functions for which the present system may be used depends largely upon the provision of control signals to command the flow of information signals. In its most elemental form, the structure hereof includes a plurality of stages each of which comprise: a pair of registers for containing the components of two vectors, and an arithmetic unit (for combining the register-held components to derive their average, sum or some other interim quantity) a transfer means for replacing the component contained in one of the registers with the derived quantity from the arithmetic unit and means for controlling the transfer means and iterative operation in accordance with control signals which may be internally developed.

Figure 2:
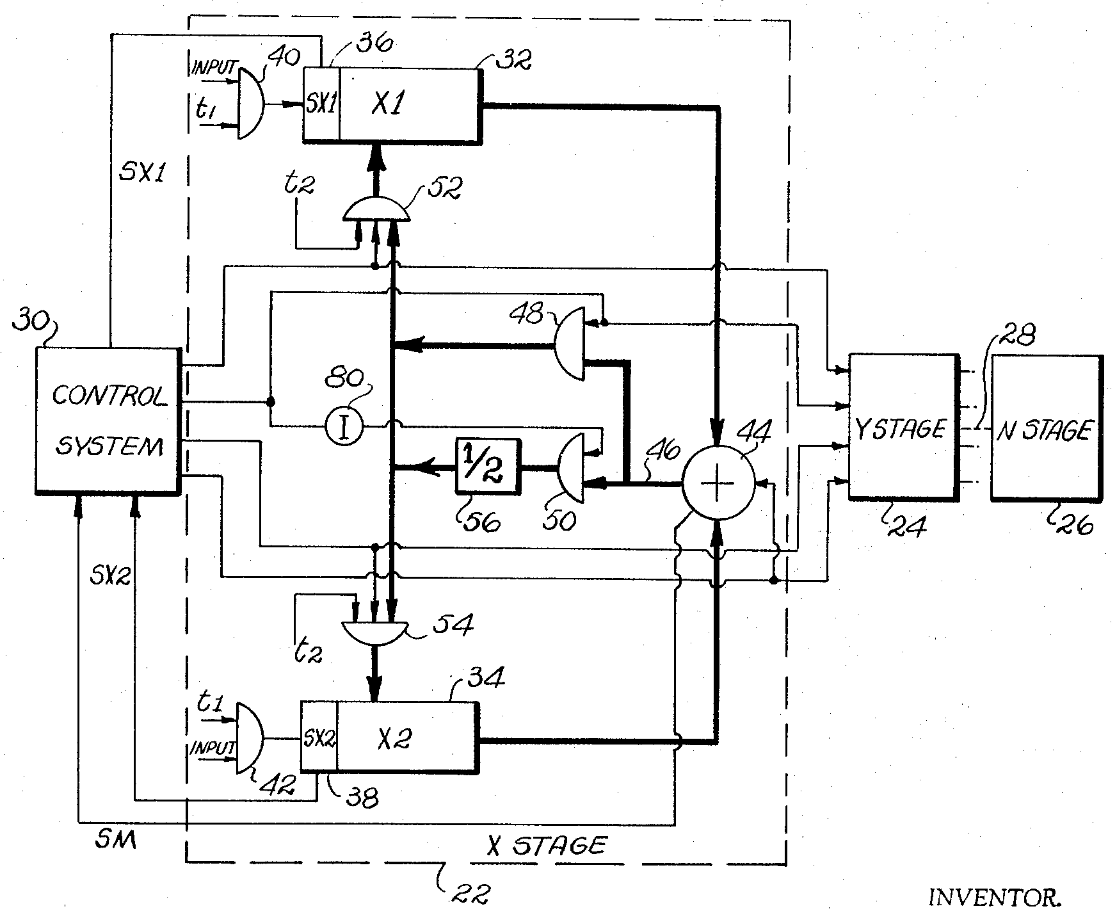
FIG. 2 is a block diagram of a structure incorporating the principles of the present invention.

In view of the above preliminary graphic and mathematical considerations relating to exemplary operations of the present system, reference will now be had to FIG. 2 which shows a system constructed in accordance with the present invention incorporating a plurality of stages to accommodate multiple-component vector quantities in computation. Specifically, the system as shown in FIG. 2 includes an X stage 22 (shown in detail) a Y stage 24 and an N stage 26. Additionally, a variable number of additional stages are also indicated by dashed lines 28 extending between the stages 24 and 26. Each of the stages 22, 24 and so on, is controlled by a control system 30 having individual connections to and from each of the individual stages. As each of the stages in the system are generally similar in structure, only the stage 22 is shown in detail.

Considering the individual representative stage 22, there are provided an upper register 32 (for a vector component of X) and a similar lower register 34. Although various radix structures may be used, as shown, binary structures are employed, as well known in the art and each includes a digital stage, specifically stages 36 and 38 respectively, for registering the sign digits of the quantities represented.

In the exemplary serial embodiment hereof, the upper component register 32 is connected to receive initial serial input signals through an "AND" and gate 40 during a preliminary operating internal identified as time *t1* and coincident to the high state of a binary signal *t1*. Somewhat similarly, the register 34 is connected to receive signals representing an initial quantity through an "AND" gate 42 which is also qualified by the time signal t1.

The registers 32 and 34 are connected to supply their contents to a binary adder 44, as generally well known in the prior art, which adder operates to develop signals representative of the sum which signals during the interval of signal *t2*, are supplied to an output conductor 46 that is in turn connected to a pair of "AND" gates 48 and 50. During any single cycle of operation, only one of the gates 48 or 50 is exclusively qualified so that the sum signals from the adder 44 are either transferred through the gate 48 directly to a multiplicity of "AND" gates e.g. gates 52 and 54, or alternatively the gate 50 is qualified to pass the sum signals through a shift or delay circuit 56, as well known in the prior art to effectively divide the sum by two, before supplying the signals to the gates 52 and 54. Again, parallel operation may be used as well known in the art.

In the operation of the system, one or the other of the gates 48 or 50 is qualified to pass the combined signals, depending upon whether the true sum or the average of the components is desired. Control in this regard is provided from the control system 30 to qualify one of the gates 52 or 54, as will be described in detail below. The control system 30 also exclusively qualifies one or the other of the gates 52 or 54 during an interval of a timing signal *t2*, to replace the prior contents of one of the registers 32 or 34 with the newly developed signal representations. It is to be noted as shown in FIG. 2, that data flow paths e.g. from the registers 32 and 34 to the adder 44 and back to one of the registers are indicated in heavy black lines while lighter lines indicate conductors carrying control signals. Thus, an arithmetic combination of the vector components is accomplished as manifest by signals that are transferred to replace one of the vector components in either the register 32 or the register 34. That cycle is repeated in accordance with signals from the control system 30 until a solution or end result is attained, the significant portion of which may be variously contained in the stages, e.g. stages 22, 24 and so on.

Recapitulating, the system, as depicted in FIG. 2 functions iteratively to arithmetically combine associated vector components, e.g. X1 and X2, Y1 and Y2 and so on, and to replace one of each pair of associated components with the newly computed component. Specifically, for example, stage 22 may determine the average value of X1 and X2 as a quantity X*m* which is then placed in one of the registers 32 or 34 depending upon the computation to be performed. For example, in one pattern of computation, the quantity X*m* from each iteration is placed in one of the registers 32 or 34 depending upon the binary bits of a scaler value. The control function is performed in each of the stages 22, 24 and so on, with the result that a vector is effectively multiplied by a scaler as described above.

To pursue this example further, assume a positive binary number (between zero and unity) is provided so that the individual bits (left to right) determine which of the registers e.g. registers 32 and 34, will have its contents replaced with a newly computed quantity. If the initial values of the vectors are V*a* (having components X1, Y1, - - - N1) and V*b* (having components X2, Y2, - - - and N2) the result of the combination will be : $Va + \alpha$ b $- Va) = \alpha Vb + (1-\alpha) Va$; in which $\alpha$ is the assumed scaler. Thus, the basic operation is a linear combination of the initial values. This is a particularly desirable operation in matrix arithmetic as well as in the computation of graphic displays.

Figure 3:
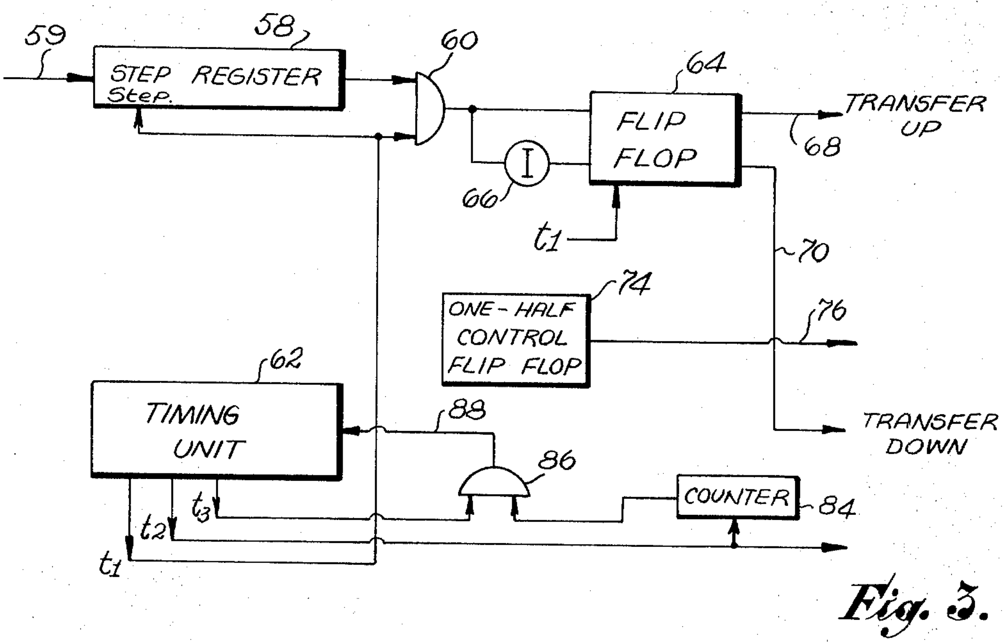
FIG. 3 is a block diagram of one portion of the system of FIG. 2 showing the portion in greater detail.

Accordingly, one operation for the system hereof involves directing the newly computed signal representations either upward or downward (as represented) depending upon the binary bits of a scaler, $\alpha$. To accomplish this operation, the control system 30 may comprise a structure substantially as shown in FIG. 3 as will now be considered in detail. Signals representing the scaler $\alpha$ are supplied to a step register 58 which is stepped with each iteration of the system of FIG. 2 to provide the scaler digits in sequence (from left to right) from the register 58 to an "AND" gate 60. Control of the register 50 to provide the individual digits of the scaler $\alpha$ is accomplished by a timing unit 62 which develops timing signals *t*1, *t*2 and *t*3 to sequence the system. Specifically, the interval of the signal *t*1 serves to load the initial vector components into the registers, e.g. registers 32 and 34 (FIG. 2) as well as to initially step the contents of the register 58. Subsequently, during the interval of the timing signal *t*2 the vector components are arithmetically combined as by addition in the adder 44. The signal-represented results of the arithmetic combination are then transferred through one of the gates 52 or 54 to replace the prior contents of one of the registers 32 or 34.

The interval *t*3 of the timing signal is a test interval to determine whether or not computation is complete. Of course, various forms of timing units may be provided for the unit 62 as well known in the prior art; however, in an illustrative system as presented herein, for purposes of simplicity the timing unit 67 simply defines four explicit time intervals in sequence by providing signals *t*1, *t*2 and *t*3, each of which is invariably sufficient to accommodate the requisite transfers within the system.

The timing signal *t*1 is applied to the digits of the scaler $\alpha$ contained in the register 58 and concurrently to qualify an "AND" gate 60 for the passage of the next binary digit signal of the scaler $\alpha$ to a flip flop 64. The flip flop 64 has one input connected directly to the gate 60 and another input connected to the gate 60 through an inverter 66. Consequently, during the interval *t*1 if a binary "1" digit is stepped from the register 58, the flip flop 64 is set to provide the high output on the line 68. Conversely, if the output binary digit is an "0" during the interval t1, the inverter 66 provides a high output to reset the flip flop 64 which in turn provides a high output to the conductor or line 70. The line 68 as shown in FIG. 3 is connected as a qualifying input to the gate 52 (FIG. 2) while the line 70 (FIG. 3) is connected to qualify the gate 54 (FIG. 2). Accordingly, if the flip flop 64 is set, the signal in the conductor 68 is high and the freshly computed vector component is passed upwardly through the gate 52 to replace the contents of the register 32. Again, conversely, if the flip flop 64 is reset, the conductor 70 carries a high signal and the gate 54 is qualified with the result that the newly computed component is transferred downwardly through the gate 54 to replace the contents of the register 34.

The control unit as shown in FIG. 3 also includes a control flip flop 74 which qualifies one or the other of the gates 48 or 50. The flip flop 74 may be manually set in advance of an interval of computation or may operate under control of an external control signal. When in a set state, the flip flop 74 provides a high signal to a conductor 76. That conductor is connected to the gate 48 (FIG. 2) with the result that when the flip flop 74 is set, the sum of the existing components becomes the freshly computed replacing component. On the contrary, if the flip flop 74 (FIG. 3) is reset, the output to the conductor 76 is low with the result that the output from an inverter 80 is high, qualifying the gate 50 to pass the newly computed sum through the delay circuit 56 to accomplish a shift in the digit signals that is tantamount to a division by "2" as well known in the prior art.

Recapitulating and summarizing in the operation of the system of FIG. 2 in cooperation with the control system as shown in FIG. 3, the components of the two vectors are initially placed in the component registers, e.g., registers 34 and 36 of each of the stages as shown in FIG. 2 during the interval of the signal *t*1. During the same interval the scaler contained in the step register 58 is stepped to provide the first digit therefrom through the "AND" gate 60 to either set or reset the flip flop 64.

Subsequently, the interval of the timing signal *t*2 is initiated during which the individual vector components in each stage (from the upper and lower component registers, e.g. registers 32 and 34) are applied to an "adder" e.g. adder 44, summed, divided by 2 (by a shift operation) and supplied back to one of the registers, e.g. register 32 or 34 depending upon which of the transfer gates is qualified. As explained above, in the event the flip flop 64 is set, the transfer gate 52 is qualified, or conversely if the flip flop 64 is reset, the transfer gate 54 is qualified.

At the conclusion of such a single cycle of operation, the system enters the interval defined by the timing signal *t*3 which is a test interval to determine whether or not the iterative process should continue with another cycle. As shown in FIG. 3 the cycles of the iterative process are tallied by a counter 84 which is preset to overflow after a predetermined number of cycles to thereby qualify an "AND" gate 86 providing a signal through a conductor 88 to halt the iterative process by causing the timing unit to remain in the state in which the timing signal *t*3 is provided high. Thus, the system as illustrated by the combination of the structures of FIGS. 2 and 3 accomplishes a linear combination of the initial values as mathematically explained above.

As considered somewhat at length above, by graphical analysis, the system hereof also may be employed to determine the location at which a line crosses a coordinate axis as discussed above with reference to FIG. 1. That is, by observing the signs of the numerical components e.g. X1, X2 and X*m* the transfer and replacement (up or down as discussed above) may be accomplished to attain or locate the point of a zero X displacement and accordingly produce the related value of Y, as indicated by the distance 18 in FIG. 1.

Figure 4:
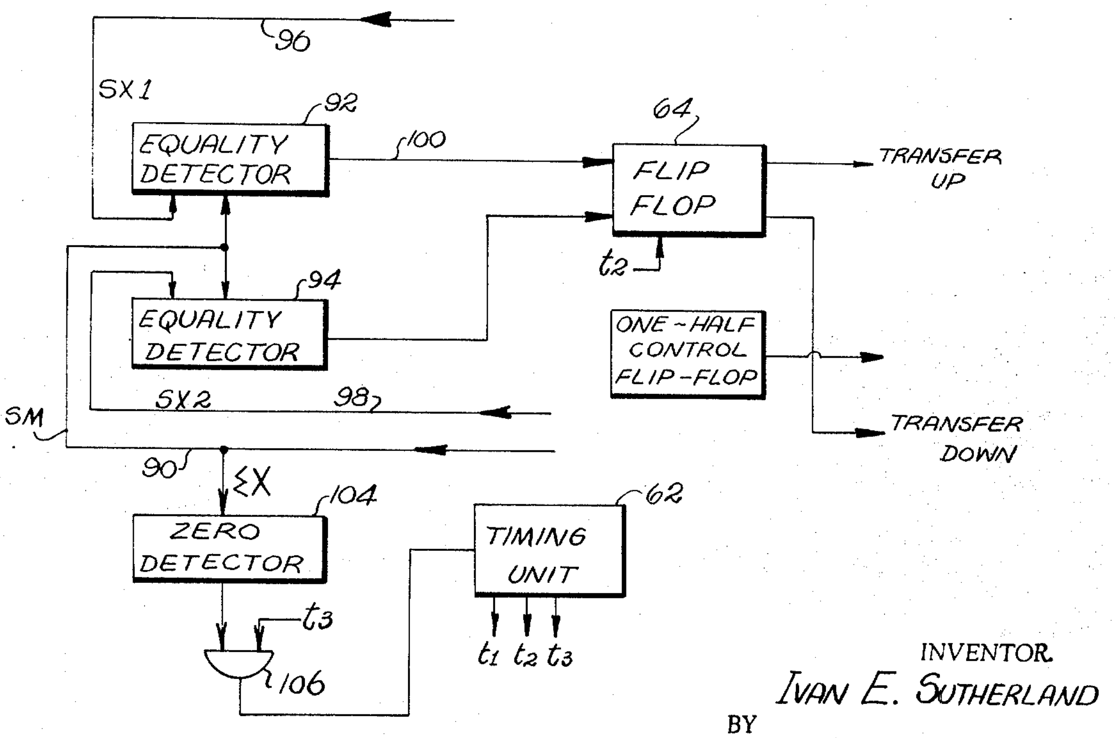
FIG. 4 is a block diagram of an alternative structural form of the portion of the system shown in FIG. 3.

The details of a control system 30 of FIG. 2 to accomplish such an operation are set forth in FIG. 4. Prior to considering the details of the control system as shown in FIG. 4, further consideration of the mathematical manipulations may be helpful. After loading, each of the vector components from the registers are additively combined, e.g. $X1+X2 \quad \Sigma X$, and $Y1+Y2 \quad \Sigma Y$, and so on. If the summation of the components X produces a zero, ($\Sigma X=0$) then the coinciding $YO=\frac{1}{2}\Sigma Y$) and the iterations may be stopped.

If the sign SMX of $\Sigma X$ equals the sign SX1 of X1 then $\frac{1}{2}\Sigma X$ is to be transferred to the X1 register, i.e. register 32. Similarly, the same operation occurs in each of the other stages, e.g. one-half the summation of Y ($\frac{1}{2}\Sigma Y$) is to be transferred to the Y1 register and so on throughout the other stages of the system.

If, on the contrary, the sign SMX of the $\Sigma X$ coincides to the sign SX2 of X2 then one-half the summation of X ($\frac{1}{2}\Sigma X$) is to be transferred to the X2 register, i.e. register 34 and similarly ½ the summation of Y is to be transferred to the Y2 register and so on throughout the stages of the system as shown in FIG. 2. This process iteratively performed accomplishes the crossing point of the Y axis at which X is reduced to zero as considered above preliminarily with reference to FIG. 1. Of course, rounding may be incorporated as well known in the prior art.

It is to be noted as indicated above that the division by two is achieved by ignoring the least significant digit of binary sums and reproducing the sign bits as well known in the prior art and which operation is accomplished within the shift unit 56 as shown in FIG. 1.

Considering the detailed structure of the control system 30 to accomplish this operation reference will now be had to FIG. 4. The sign digit signals SMX in the form of binary signals from the summation of the X components are received through a conductor 90 and supplied to a pair of sign equality detectors 92 and 94. Signals SX1 and SX2 (representative of the signs of the registered vector components) are applied through conductors 96 and 98 to the equality detectors 92 and 94 respectively for comparison with the binary signal SMX (representative of the sign of the summation). In the event that the sign of the summation (manifest by the signal SMX matches the sign of X1 (manifest by a signal SX1) an output signal is provided through a conductor 100 to set a flip flop 64 similar to the similarly identified flip flop of FIG. 3. Conversely, if the equality detector 94 senses equality between the signs manifest by the signals SMX and SX2, the flip flop 64 is reset. In the system of FIG. 4 the flip flop 64 is set or reset at the start of the interval t2 accordingly the transfer is either upward (if set) or conversely downward if the flip flop 64 is reset.

The summation value represented by a signal $\Sigma X$ is applied to a zero detector 104 which provides a high output at a time when the additive combination of the X components (X1 and X2) results in a zero. Thereupon, an "AND" gate 106 is qualified during the interval of a timing signal $t3$ to provide a signal to the timing unit 62 which terminates the iterative process. Thus, the system computes a coordinate axis crossing in that the value contained in the Y stage (FIG. 2) manifests the distance represented by the length 18 as shown in FIG. 1 when the component X has been reduced to zero.

Of course, the above explanation, for purposes of simplicity has been directed to rather simple two-dimensional examples. However, the system has wide application in multi-dimensional situations. For example, in the case of linear programming it may be desirable to control the flow of the summation quantities upward or downward in accordance with a test of several component signs, e.g. the sign of $\Sigma X$, the sign of $\Sigma Y$ and so on. It may also be desirable to shift all summations downward until such time as a certain condition holds for all of the individual component summations. Of course a control of the shifts (upward, downward or mixed) has a broad number of possibilities depending upon a particular problem to be solved.

For example, referring to FIG. 2, the number of stages utilized may be increased from the two-dimensional example, to solve problems of more than two dimensions. Specifically, if the sign testing is performed on the X registers 32 and 34 of a system with X Y and N register sets operative then the Y and N coordinates where a line penetrates the YN plane can easily be determined. Similarly, in a multidimensional situation the coordinates where a multi-dimensional line penetrates a multi-dimensional hyperplane can easily be found.

If sign testing is performed on more than one coordinate register pair, simultaneous conditions can be discovered utilizing certain structure disclosed in the above referenced patent application herewith, for example, the technique may be used of combined tests from four components to discover where a line penetrates a rectangular boundary, Similarly, in a multi-dimensional situation, testing of several components of the vector sum can yield solutions to complex sets of conditions involving several planes.

It must be noted that whereas the testing that is described in this disclosure results in answers referring to where a line penetrates a plane parallel to the coordinate axes chosen, simple change of coordinate system before loading numbers into the vector interpolator can yield correct answers for oblique planes. For example, if the contents of a two-component system are made to be $X+Y$ and $X-Y$ respectively, then the planes tested will be at 45° to the original coordinate axes.

In addition to the geometric and pseudo-geometric applications mentioned already, the vector interpolation system can easily be employed in the mathematical problem of matrix inversion. Such application of the vector interpolator as shown in FIG. 2 as a component enables a system in which a lot of hardware is operated simultaneously to produce a matrix inversion much more quickly than could be performed with a single adder system. In fact, with a multiplicity of vector interpolators, as shown in FIG. 2, matrix inversion can be achieved in N & M add times, where M is the binary precision of the numbers in the N & N matrix.

The method of matrix inversion used in such a system is a very old and straightforward one and will be apparent to those skilled in the art of matrix algebra. However, it is set forth herein merely to exemplify an application of the structure hereof in an iterative pattern of synchronized computation. The matrix to be inverted (here shown as a $5 \times 5$ matrix) is written adjacent to an identity matrix as follows:

$$\begin{bmatrix} \cdot & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \end{bmatrix}$$

$$\begin{bmatrix} \cdot & \cdot & \cdot & \cdot & \cdot \\ 0 & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \end{bmatrix}$$

$$\begin{bmatrix} \cdot & \cdot & \cdot & \cdot & \cdot \\ 0 & \cdot & \cdot & \cdot & \cdot \\ 0 & \cdot & \cdot & \cdot & \cdot \\ 0 & \cdot & \cdot & \cdot & \cdot \\ 0 & \cdot & \cdot & \cdot & \cdot \end{bmatrix}$$

$$\begin{bmatrix} \cdot & 0 & \cdot & \cdot & \cdot \\ 0 & \cdot & \cdot & \cdot & \cdot \\ 0 & 0 & \cdot & \cdot & \cdot \\ 0 & 0 & \cdot & \cdot & \cdot \\ 0 & 0 & \cdot & \cdot & \cdot \end{bmatrix}$$

$$\begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

$$\begin{bmatrix} 1 & 0 & 0 & 0 & 0 \\ \cdot & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

$$\begin{bmatrix} 1 & 0 & 0 & 0 & 0 \\ \cdot & 1 & 0 & 0 & 0 \\ \cdot & 0 & 1 & 0 & 0 \\ \cdot & 0 & 0 & 1 & 0 \\ \cdot & 0 & 0 & 0 & 1 \end{bmatrix}$$

$$\begin{bmatrix} \cdot & \cdot & 0 & 0 & 0 \\ \cdot & 1 & 0 & 0 & 0 \\ \cdot & \cdot & 1 & 0 & 0 \\ \cdot & \cdot & 0 & 1 & 0 \\ \cdot & \cdot & 0 & 0 & 1 \end{bmatrix}$$

$$\begin{bmatrix} \cdot & 0 & 0 & 0 & 0 \\ 0 & \cdot & 0 & 0 & 0 \\ 0 & 0 & \cdot & 0 & 0 \\ 0 & 0 & 0 & \cdot & 0 \\ 0 & 0 & 0 & 0 & \cdot \end{bmatrix} \quad \begin{bmatrix} \cdot & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \end{bmatrix}$$

$$\begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix} \quad \begin{bmatrix} \cdot & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \end{bmatrix}$$

INVERSE

The mathematical objective is to replace the rows of the pair of matricies with linear combinations of former rows in such a way that the left hand matrix is reduced to the identity and the right hand matrix becomes the inverse. The vector interpolators (FIG. 2) used will be 10 components or stages long. In the general case of N by N matrices, the vector interpolator used would be 2N stages long.

The inversion is accomplished with a single vector interpolator, but it will be obvious to those skilled in that art, that simultaneous application of several interpolators is possible. The vector interpolator is first loaded with the first and second rows of the combined matrix. The signs of the first components of these rows are checked. If they are the same, one of the rows is replaced, element by element, with the negative of its value, so that the signs of the first component of the two vectors are different. The vector interpolation process described above is then applied so that a linear combination of the two rows is generated such that its first component is zero as explained above with reference to the analytical presentation of FIG. 1. This result replaces the second row of the combined matrix.

The process is now repeated with the first and third rows of the combined matrix, again testing the first component so that a zero value is produced there. When this process has been repeated 4 times (in our example, in general N-1 times), the first column of the combined matrix will contain zeros in all but the uppermost position.

The process is now repeated with the first and second rows of the matrix, but this time the testing is done on the second component of the vector. Thus a linear combination of the new first and second rows is produced which has a zero value for its second component. Similar application of the vector interpolator with testing in the second column will produce zeros everywhere in the second column except in the second position.

The process is used similarly to produce zeros in all but the third position of the third column, and so on until a diagonal matrix results in the left part of the combined matrices as shown above. The remaining numbers may then all simultaneously be divided by the values of their corresponding diagonals as shown in the earlier example to produce the inverse.

It is well known in this method of matrix inversion that a preliminary search for the largest value in a particular column, and a swap of rows so that the largest value in the column (the pivot term) lies on the diagonal, will improve the numerical accuracy of the method considerably. Obviously the adders of the vector interpolator can be used to accomplish the search.

Again, various systems can effectively utilize the structure hereof either singularly or in a plurality; however, no effort has been made to cover all the various possibilities; rather, certain examples have been set forth merely to illustrate the flexibility of the basic structure hereof including the plurality of stages, each for vector component and each including the structures illustratively set forth above.

Accordingly, what is claimed is:

1. A computing system comprising:

a first register means including a plurality of first registers to register a first plurality of vector components;

a second register means including a plurality of second registers to register a second plurality of vector components;

means for providing signals in said first register means and said second register means representative respectively of said first and second pluralities of vector components;

a plurality of arithmetic means, each for receiving signal representations from said first and second register means for arithmetically individually combining said first vector components from said first register means with said second vector components from second register means to provide signals representative of additive combinations of each of said first and second vector components;

a plurality of gating means connected to each of said arithmetic means, at least one of said gating means including means for acting on received signals to divide representative values by a predetermined number;

transfer means for transferring signals from said gating means connected to each of said arithmetic means, to one of said register means connected to such arithmetic means, to thereby replace the contents of such register means; and control means for controlling said transfer means, said arithmetic means and said gating means, to perform iterative computation on each of said vector components simultaneously until a stage of solution is attained.

2. A system according to claim 1 wherein said arithmetic means includes a plurality of adder units, each for receiving a component from each of said register means, and for providing signals representative of the average value of each of said components received.

3. A system according to claim 1 wherein said control means includes means to receive signals representative of the sign of at least one of said components registered in said register means to provide signals for controlling said transfer means.

4. A system according to claim 3 wherein said control means further includes means to logically test signals representative of the signs of certain of said components registered in said register means to provide signals to control said transfer means.

* * * * *